United States Patent
Liu et al.

(10) Patent No.: US 10,620,735 B2
(45) Date of Patent: Apr. 14, 2020

(54) FORCE TOUCH MODULE, MANUFACTURING METHOD THEREOF, DISPLAY SCREEN AND DISPLAY DEVICE

(71) Applicants: BOE TECHNOLOGY GROUP CO., LTD., Beijing (CN); ORDOS YUANSHENG OPTOELECTRONICS CO., LTD., Ordos, Inner Mongolia (CN)

(72) Inventors: Lina Liu, Beijing (CN); Hualing Yang, Beijing (CN)

(73) Assignees: BOE TECHNOLOGY GROUP CO., LTD., Beijing (CN); ORDOS YUANSHENG OPTOELECTRONICS CO., LTD., Ordos (CN)

(*) Notice: Subject to any disclaimer, the term of this patent is extended or adjusted under 35 U.S.C. 154(b) by 10 days.

(21) Appl. No.: 16/006,303

(22) Filed: Jun. 12, 2018

(65) Prior Publication Data
US 2019/0079629 A1    Mar. 14, 2019

(30) Foreign Application Priority Data
Sep. 13, 2017    (CN) .......................... 2017 1 0822740

(51) Int. Cl.
G06F 3/041    (2006.01)

(52) U.S. Cl.
CPC .......... G06F 3/0414 (2013.01); G06F 3/0412 (2013.01); G06F 3/04164 (2019.05); G06F 3/04144 (2019.05); G06F 2203/04102 (2013.01); G06F 2203/04103 (2013.01); G06F 2203/04105 (2013.01)

(58) Field of Classification Search
CPC .. G06F 3/0414; G06F 3/04164; G06F 3/0412; H01L 27/323; H01L 27/3276
See application file for complete search history.

(56) References Cited

U.S. PATENT DOCUMENTS

| | | | |
|---|---|---|---|
| 2017/0221971 A1* | 8/2017 | Shen | H01L 27/323 |
| 2017/0315657 A1* | 11/2017 | Lai | G06F 3/0412 |
| 2018/0136762 A1* | 5/2018 | Jeong | G02F 1/133305 |

\* cited by examiner

*Primary Examiner* — Sardis F Azongha
(74) *Attorney, Agent, or Firm* — Ladas & Parry LLP

(57) ABSTRACT

A force touch module, a manufacturing method thereof, a touch screen, and a display device are disclosed. The force touch module includes a first substrate, a second substrate, an insulation layer, a force sensor, a via hole, and a connection line. The second substrate is located on the first substrate. The insulation layer is located between the first substrate and the second substrate. The force sensor includes a first sensing electrode; the first sensing electrode is located between the insulation layer and the first substrate. The via hole passes through the second substrate and the insulation layer. The connection line is located on a side of the second substrate away from the first substrate, and the connection line is electrically connected with the first sensing electrode through the via hole.

19 Claims, 14 Drawing Sheets forming a first substrate, and laying an electrode material on the first substrate as a first sensing electrode of a force sensor

forming an insulating layer on the first sensing electrode

forming a second substrate on the insulating layer

forming a via hole on the second substrate at a position corresponding to the first sensing electrode, and the via hole passes through the insulating layer

forming a connection line on the second substrate, and one end of the connection line being connected with the first sensing electrode through the via hole, and the other end being connected to a force sensing flexible circuit

Fig. 8

FORCE TOUCH MODULE, MANUFACTURING METHOD THEREOF, DISPLAY SCREEN AND DISPLAY DEVICE

CROSS REFERENCE TO RELATED APPLICATIONS

The present application claims priority of China Patent application No. 201710822740.7 filed on Sep. 13, 2017, the content of which is incorporated in its entirety as portion of the present application by reference herein.

TECHNICAL FIELD

Embodiments of the present disclosure relate to a force touch module, a manufacturing method thereof, a display screen, and a display device.

BACKGROUND

With the rapid development of display technology, touch screens have been gradually spread to various aspects of people's lives. According to the work principle, touch screens can be divided into: a resistance type, a capacitive type, an infrared type, a surface acoustic wave type, an electromagnetic type, a vibration wave sensing type, and a frustrated total internal reflection optical sensing type. The capacitive type touch screen has become a research hotspot due to its advantages such as unique touch control principle, high sensitivity, long lifespan and high light transmittance. The electromagnetic type touch screen can be widely used in many high-end computer aided drawing systems, such as AutoCAD, due to its feature of realizing the original handwriting.

At the same time, with the rapid development of portable electronic terminal devices, especially mobile phones and tablet technologies, more and more new technologies are being applied to these terminal devices. Force touch technology is a new technology which draws extensive attention in the present field, and is called "a great change after multi-touch technology." By means of using the force touch technology, the terminal devices can not only recognize every touch of the user, but also sense the magnitude of the touch, and give different feedbacks according to the magnitude of the touch. For example, upon a user viewing a picture, a system of a mobile phone automatically enlarges the picture according to the force of the user's finger on the screen. For example, the greater the force, the greater enlargement extent of the picture.

SUMMARY

At least one embodiment of the present disclosure provides a force touch module, a manufacturing method thereof, a touch screen, and a display device.

At least one embodiment of the present disclosure provides a force touch module, comprising: a first substrate; a second substrate on the first substrate; an insulation layer, located between the first substrate and the second substrate; a force sensor, comprising a first sensing electrode located between the insulation layer and the first substrate; a via hole, at least passing through the second substrate and the insulation layer; and a connection line, located on a side of the second substrate away from the first substrate, the connection line being electrically connected with the first sensing electrode through the via hole.

According to the force touch module provided by one or more embodiments of the present disclosure, a first end of the connection line is electrically connected with the first sensing electrode through the via hole.

According to the force touch module provided by one or more embodiments of the present disclosure, a second end of the connection line is connected to a force sensing flexible circuit.

According to the force touch module provided by one or more embodiments of the present disclosure, the connection line is electrically connected with the first sensing electrode via a force sensing signal line.

According to the force touch module provided by one or more embodiments of the present disclosure, the force sensing signal line is located between the insulation layer and the first substrate.

According to the force touch module provided by one or more embodiments of the present disclosure, the force sensing signal line and the first sensing electrode are in a same layer.

According to the force touch module provided by one or more embodiments of the present disclosure, the first sensing electrode is made of silver paste.

According to the force touch module provided by one or more embodiments of the present disclosure, the first sensing electrode comprises at least one force sensing electrode pattern, and each sensing electrode pattern is connected to the force sensing flexible circuit through respective connection lines.

According to the force touch module provided by one or more embodiments of the present disclosure, the first sensing electrode comprises a plurality of force sensing electrode patterns, and each of the plurality of force sensing electrode patterns is connected to the force sensing flexible through respective connection lines, each of the connection lines is electrically connected to the force sensing electrode pattern through respective via holes, and via holes of the connection lines are not in a straight line.

According to the force touch module provided by one or more embodiments of the present disclosure, a value of a sheet resistance of each force sensing electrode pattern is less than a sheet resistance threshold value.

According to the force touch module provided by one or more embodiments of the present disclosure, the sheet resistance threshold value is 20 Ω/sq.

According to the force touch module provided by one or more embodiments of the present disclosure, both the first substrate and the second substrate are flexible substrates.

According to the force touch module provided by one or more embodiments of the present disclosure, the force touch module further comprises a thin film transistor, a light emitting element and an encapsulation layer, which are sequentially disposed on the second substrate; wherein the thin film transistor, the light emitting element and the first sensing electrode are connected to a same flexible circuit for display.

According to the force touch module provided by one or more embodiments of the present disclosure, the force sensor further comprises a second sensing electrode, and the second sensing electrode is located on a side of the first substrate opposite to the first sensing electrode.

At least one embodiment of the present disclosure further provides a manufacturing method of a force touch module, comprising: forming a first sensing electrode of a force sensor on a first substrate; forming an insulation layer on the first sensing electrode; forming a second substrate on the insulation layer; forming a via hole at least passing through the second substrate and the insulation layer; and forming a connection line on a side of the second substrate away from the first substrate, and the connection line being electrically connected with the first sensing electrode through the via hole.

A manufacturing method provided by one or more embodiments according to the present disclosure, upon forming the first sensing electrode on the first substrate, simultaneously forming a force sensing signal line electrically connected with the first sensing electrode, wherein the connection line is electrically connected with the first sensing electrode via the force sensing signal line.

A manufacturing method provided by one or more embodiments according to the present disclosure, the force sensor further comprises a second sensing electrode, and the second sensing electrode is located on a side of the first substrate opposite to the first sensing electrode.

A manufacturing method provided by one or more embodiments according to the present disclosure, one end of the connection line is connected with the first sensing electrode through the via hole, and the other end of the connection line is connected to a force sensing flexible circuit, and the force sensing flexible circuit and a flexible circuit used for display are bonded through a same process.

At least one embodiment of the present disclosure further provides a touch screen, comprising any one of the above-mentioned force touch modules.

At least one embodiment of the present disclosure further provides a display device, comprising any one of the above-mentioned touch screens.

BRIEF DESCRIPTION OF THE DRAWINGS

In order to clearly illustrate the technical solution of embodiments of the present disclosure, the drawings of the embodiments will be briefly described in the following, it is obvious that the drawings in the description are only related to some embodiments of the present disclosure and not limited to the present disclosure.

FIG. 8 is a schematic diagram of a manufacturing method of a force touch module provided by another embodiment of the present disclosure.

DETAILED DESCRIPTION

In order to make objects, technical details and advantages of the embodiments of the present disclosure apparent, the technical solutions of the embodiments of the present disclosure will be described in a clearly and fully understandable way in connection with the drawings related to the embodiments of the disclosure. It is obvious that the described embodiments are just a portion but not all of the embodiments of the present disclosure. Based on the described embodiments herein, those skilled in the art can obtain other embodiment(s), without any inventive work, which should be within the scope of the present disclosure.

Unless otherwise defined, the technical terms or scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may comprise an electrical connection, directly or indirectly. "On," "under," "right," "left" and the like are only used to indicate relative position relationship, and when the position of the object which is described is changed, the relative position relationship may be changed accordingly.

In general, in order to achieve a force touch function, a layer of film material needs to be added on a backside or other positions of a display module.

Figure 1:
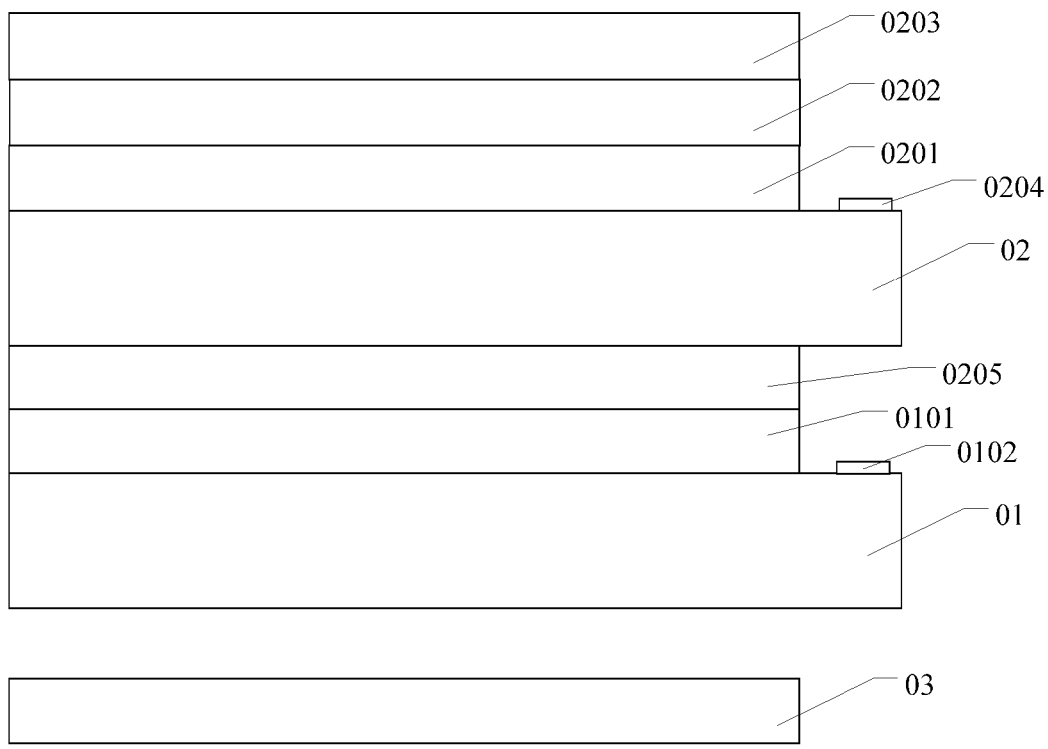
FIG. 1 is a schematic structural diagram of a force touch module.

As illustrated by FIG. 1, an OLED display touch screen is taken as an example, an array substrate includes a base substrate 02, and a thin film transistor layer 0201, a light emitting element layer 0202, and an encapsulation layer 0203 which are disposed on the base substrate 02. An FPC (flexible printed circuit) 0204 is further provided on the base substrate 02. For example, the FPC 0204 can be at least one of a 2D touch FPC and an FPC for screen display, but is not limited thereto. The FPC 0204 is provided on an upper side of the base substrate 02. A base film 0205 can further be provided on an underside of the base substrate 02.

As illustrated by FIG. 1, in order to realize a force touch function, a film material is added on a backside of a display module to form a force sensing layer. The base substrate 01 is provided with a force sensing layer 0101 and a force sensing FPC 0102. The other electrode layer 03 of force touch and the force sensing layer 0101 cooperate to achieve detection of a touch force. For example, the electrode layer 03 can be an electrode layer with a constant voltage. For example, the electrode layer 03 can be a middle frame. For example, the electrode layer 03 can be a middle frame of a mobile phone.

This kind of configuration has the following drawbacks.

In the first aspect, this kind of configuration makes the force sensing layer need to be controlled by an independent chip or circuit, resulting in a more complex structure of the display device and an increase in thickness and costs.

In the second aspect, because the force sensing signal line in the added force sensing layer needs to be connected to a flexible circuit of a display screen, an additional bonding process is required, which increases the processes and also reduces the product yield. For example, the FPC 0204 and the force sensing FPC 0102 require two bonding processes and need to be bonded separately.

In the third aspect, because the flexible circuit of screen, the 2D touch flexible circuit, and the 3D touch flexible circuit may generate certain signal interference at the three positions, the difficulty of the bonding processes will be further increased.

In the fourth aspect, usually, this type of force sensing layer can only perform a single-point force touch, resulting in a poor final effect of force touch.

The inventor(s) has found that the current way of adding a force touch function to a display screen not only increases the thickness and costs of the display screen, but also makes the structure and the processes of the display device more complicated, and reduces the product yield of the bonding process.

In the related applications of force touch in the current display field, especially the flexible display is gradually becoming a new trend of the display field. After that, a force touch technology in a flexible screen comes along. However, because the usual way of using force touch not only increases one bonding process, but also reduces the product yield, and increases the thickness of the display screen as well.

In the embodiments of the present disclosure, the force sensing signal line of force touch is led out to an upper side of the display substrate 02, so that it can be achieved that the FPC 0204 and the force touch FPC 0102 can be bonded by one bonding process, thereby saving the processes, and reducing the thickness of a touch display device. It should be noted that, in the embodiments of the present disclosure, the FPC bonding is described as an example, but other bonding processes can also be used. For example, COF (Chip-on-Film), COG (Chip-on-Glass) or the like can also be used to achieve the connection of an electrode on an array substrate and an external drive integrated circuit.

Hereafter, the present disclosure will be described in detail with reference to the specific embodiments.

Figure 2A:
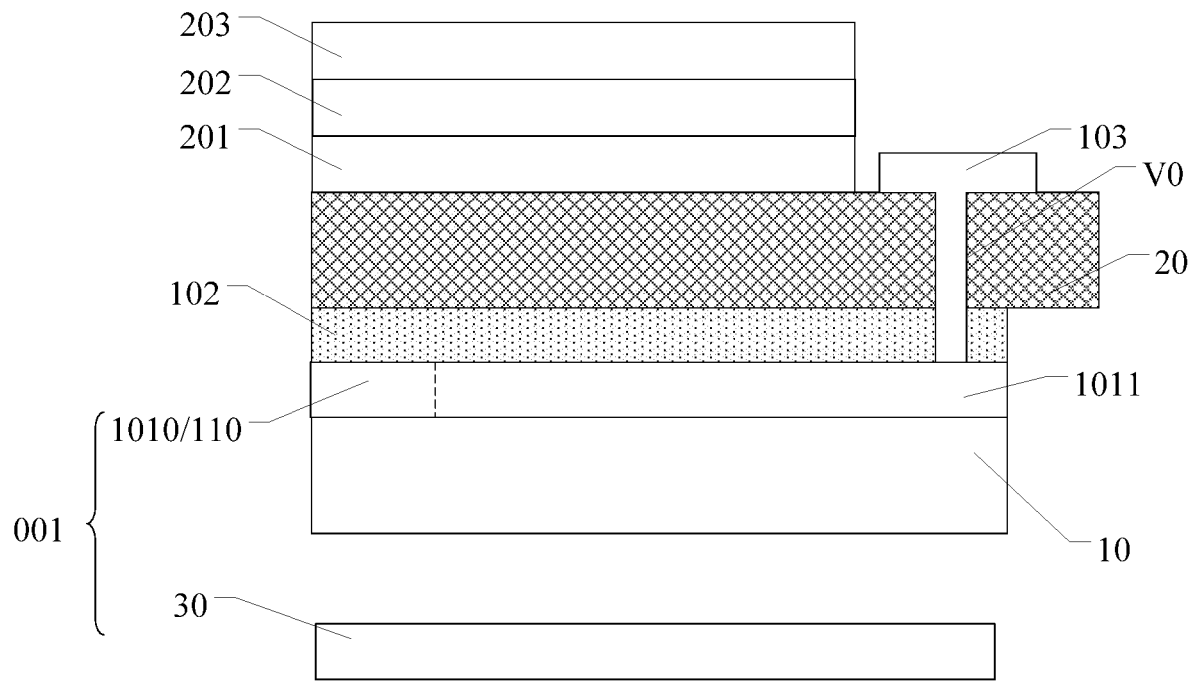
FIG. 2A is a schematic structural diagram of a force touch module provided by an embodiment of the present disclosure (which can be a sectional view taken along line E-F in FIG. 2B)

FIG. 2A is a schematic structural diagram of a force touch module according to an embodiment of the present disclosure. The force touch module includes: a first substrate 10, a second substrate 20, and a first sensing electrode 110 of a force sensor 001. For example, in some embodiments of the present disclosure, both the first substrate and the second substrate are flexible substrates. For further example, a material of the flexible substrates is polyimide (P1). For example, both the first substrate and the second substrate can be insulation substrates.

For example, a second sensing electrode 30 of the force sensor 001 can cooperate with the first sensing electrode 110 to achieve force detection. For example, the second sensing electrode 30 can be connected to a reference voltage terminal. For example, the reference voltage terminal can be a constant voltage. For example, the second sensing electrode 30 can be a middle frame of a device, but is not limited thereto. For example, the middle frame herein refers to a plate shaped structure which is located under a touch screen, relatively fixed, and configured to support the touch screen in a display device; or, the middle frame can also be other layer structures whose positions are relatively fixed in the device, and can use some existing layer structures or an additional layer structure, so that the first sensing electrode and the second sensing electrode are relatively parallel with each other, to form two sensing electrodes of a sensor. For example, in a display screen of a mobile phone, the second sensing electrode 30 can be a portion of a middle frame, excluding a frame support layer of the middle frame, of a mobile phone.

For example, as illustrated by FIG. 2A, in the present embodiment, a case where the first sensing electrode 110 and a force sensing signal layer 110 thereof are formed in the same layer is taken as an example, this kind of configuration can reduce the processes and the thickness of the display device. A top view of the first sensing electrode 1011 and the force sensing signal line 1011 thereof can refer to FIG. 2B, and the description of FIG. 2B will be described in detail in the following. In the other embodiments, the first sensing electrode 110 and the force sensing signal line 1011 can be disposed in different layers.

For example, as illustrated by FIG. 2A, an insulation layer 102 is provided between the first substrate 10 and the second substrate 20. The insulation layer 102 can prevent the external static electricity from damaging an internal circuit. For example, a material of the insulation layer 102 between the two substrates can be an inorganic insulation layer, such as SiOx, but not limited thereto. The first sensing electrode 1011 is disposed between the insulation layer 102 and the first substrate 10.

For example, as illustrated by FIG. 2A, the connection line 103 is electrically connected with the force sensing signal line 1011. The connection line 103 is electrically connected to the force sensing signal line 1011 through a via hole V0 passing through the second substrate 20 and the insulation layer 102. The force sensing signal line 1011 is electrically connected with the first sensing electrode 110. In this way, the first sensing electrode 110 is led out to an upper side of the second substrate 20, so as to be convenient for being bonded with other signal lines located on the upper side of the second substrate 20 in one bonding process.

The force touch module provided in the examples of the present disclosure is described by taking a case where the via hole V0 passes through the second substrate 20 and the insulation layer 102 as an example, but is not limited thereto. The via hole V0 can at least passes through the second substrate and at least one insulation layer.

The force touch module provided by the examples of the present disclosure can add a touch function without increasing the thickness of the display screen too much, simplify the processes, and improve the product yield of the products.

For example, as illustrated by FIG. 2A, the second substrate 20 is provided with a thin film transistor layer 201, a light emitting element layer 202, and an encapsulation layer 203 thereon, but it is not limited thereto. For example, the light emitting element layer 202 can be an organic diode, but it is not limited thereto. The second substrate 20 can also have other structures thereon, and is not limited to form an organic light emitting diode display screen.

Figure 2B:
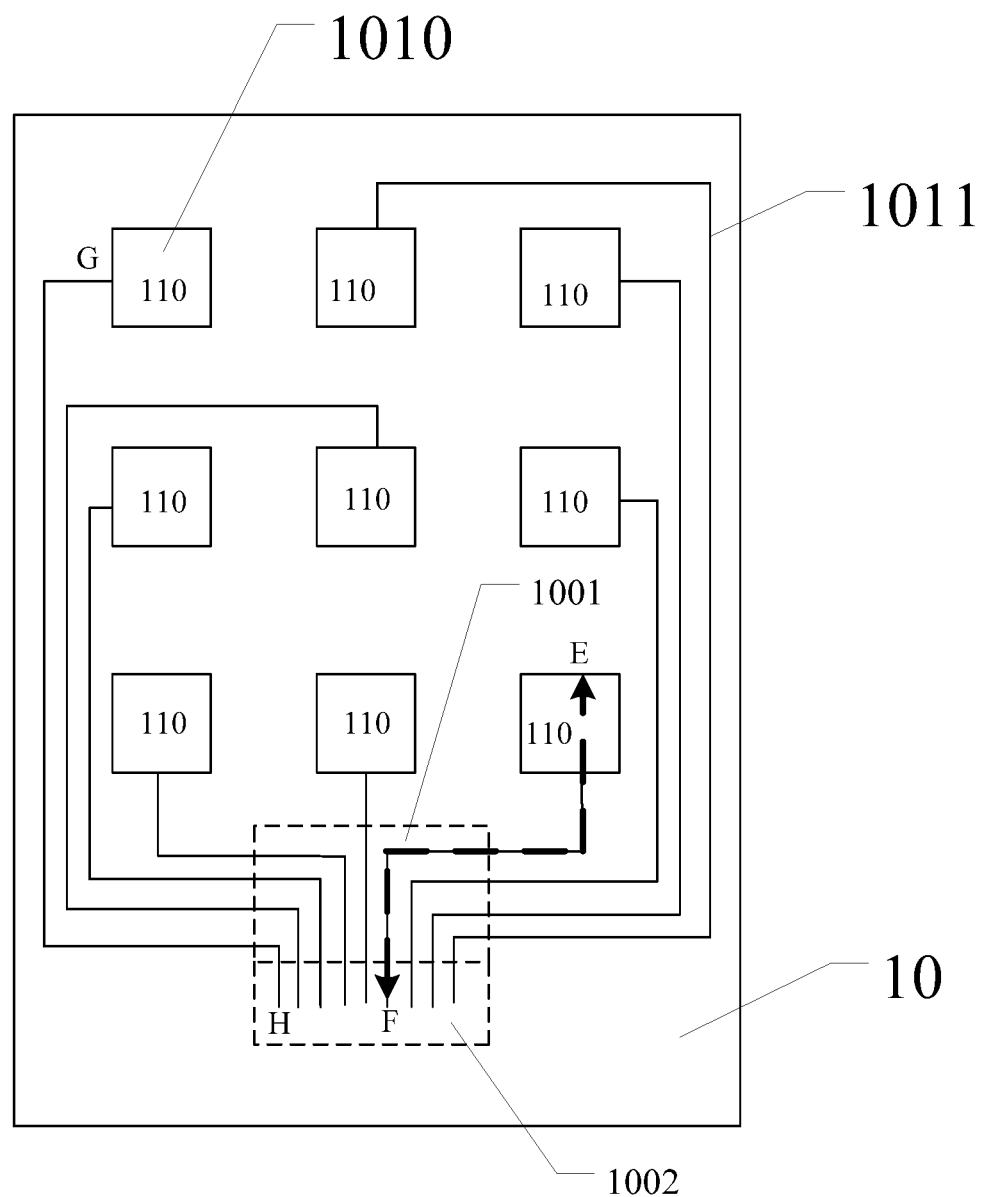
FIG. 2B is a schematic top view of forming a first sensing electrode and a force sensing signal line in the same layer in a force touch module according to an embodiment of the present disclosure (other layer structures are not illustrated)

For example, as illustrated by FIG. 2B, the first sensing electrode 110 can include a plurality of force sensing electrode patterns 1010, but it is not limited thereto. For example, in FIG. 2B, a case where the first sensing electrode 110 includes nine independent force sensing electrode patterns 1010 in total arranged in three rows and three columns is described as an example. For example, each of the force sensing electrode patterns 1010 can be connected with one force sensing signal line 1011 respectively.

For example, as illustrated by FIG. 2B, taking the force sensing electrode pattern 1010 at the top left corner as an example. A point where the force sensing signal line 1011 contacts the connection line 103 can be located at any point in a path of the force sensing signal line 1011, for example, any point from G to H on the force sensing signal line 1011. The point where the sensing signal line 1011 contacts the connection line 103 is a position where the via hole V0 is located.

In FIG. 2B, each of the force sensing electrode patterns 1010 is connected with respective force sensing signal lines 1011, and the force sensing signal lines 1011 are gathered to a fan-out area 1001 through the left and right sides or the lower side of the base substrate 10 and extended to a connection area 1002. It should be noted that although the force sensing signal lines 1011 are gathered here, but are not bonded here. Instead, as described above, each of the sensing signal lines 1011 is electrically connected with the connection line 103 through respective via holes V0, so as to be led out to the upper side of the second substrate 20.

Figure 2C:
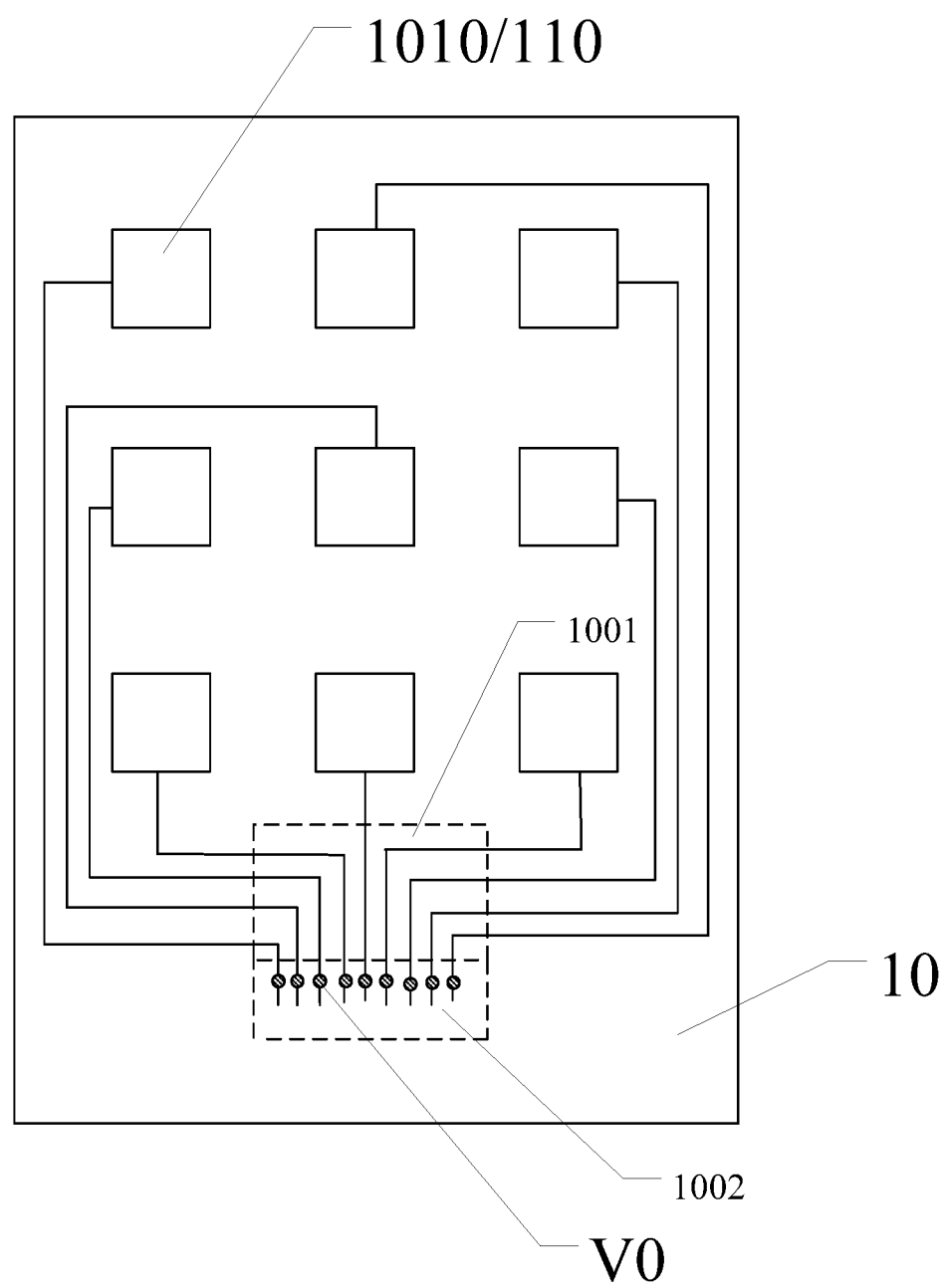
FIG. 2C is a schematic diagram of a via hole passing through a second substrate and an insulation layer in a force touch module according to an embodiment of the present disclosure.

FIG. 2C is a schematic top view of via holes V0 corresponding to force sensing signal lines in a force touch module provided by an embodiment of the present disclosure. As illustrated by FIG. 2C, each of the via holes V0 corresponds to a portion of each of the force sensing signal lines located in the connection area 1002. For example, as illustrated by FIG. 2C, the via holes V0 can be located on the same straight line. For clarity, the insulation layer 102 and the second substrate 20 are not illustrated in FIG. 2C. Via holes V0 can also be arranged in other ways.

Figure 2D:
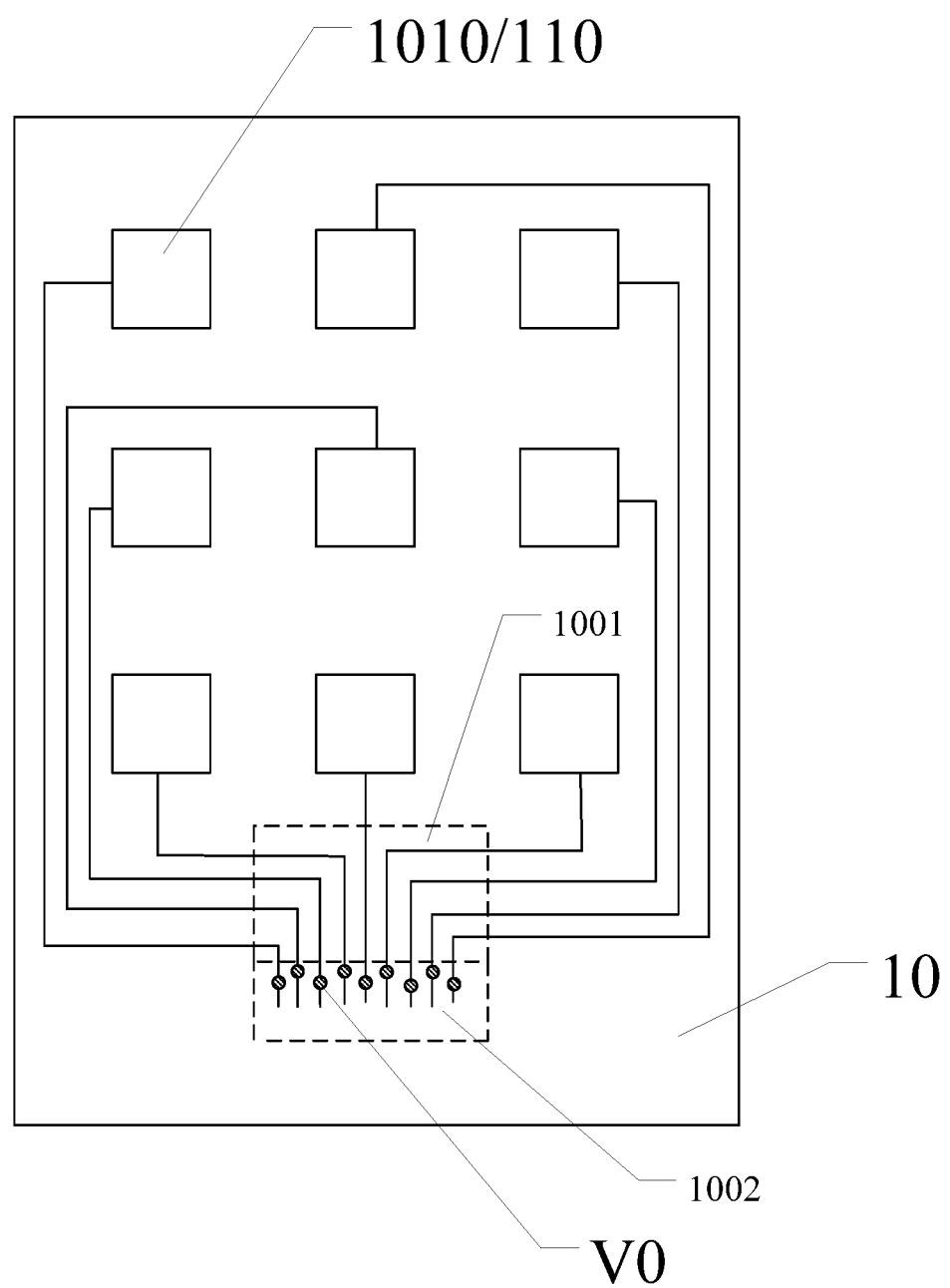
FIG. 2D is a schematic diagram of a via hole passing through a second substrate and an insulation layer in a force touch module provided by another embodiment of the present disclosure.

FIG. 2D is a schematic top view of via holes V0 corresponding to force sensing signal lines in a force touch module provided by another embodiment of the present disclosure. If the via holes V0 are connected by a line, the line can be formed with a zigzag shape. For example, two adjacent via holes V0 in the same straight line are provided with another via hole therebetween which is not located on the straight line.

Figure 2E:
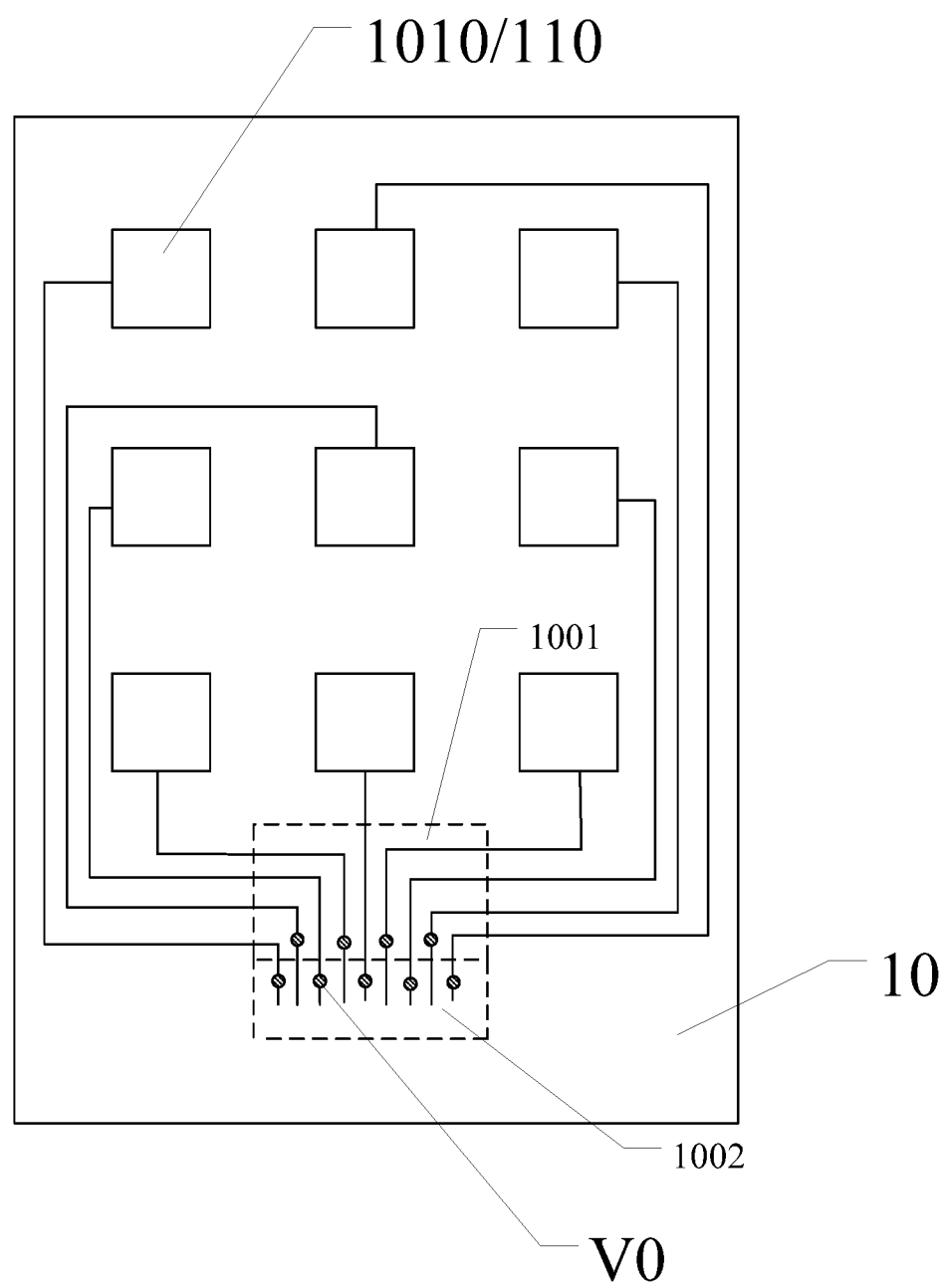
FIG. 2E is a schematic diagram of a via hole passing through a second substrate and an insulation layer in a force touch module according to another embodiment of the present disclosure.

FIG. 2E is a schematic top view of via holes V0 corresponding to force sensing signal lines in a force touch module provided by another embodiment of the present disclosure. As illustrated by FIG. 2E, a part of the via holes V0 can be disposed in the fan-out area 1001, and a part of the via holes can be disposed in the connection area 1002.

Of course, in the embodiments of the present disclosure, the via holes V0 can also be disposed on a side of the first substrate 10. For example, via holes V0 can also be provided on the left and right sides of the first substrate 10. As long as the electrical connection between the connection line 103 and the force sensing signal line 1011 can be achieved.

Figure 3A:
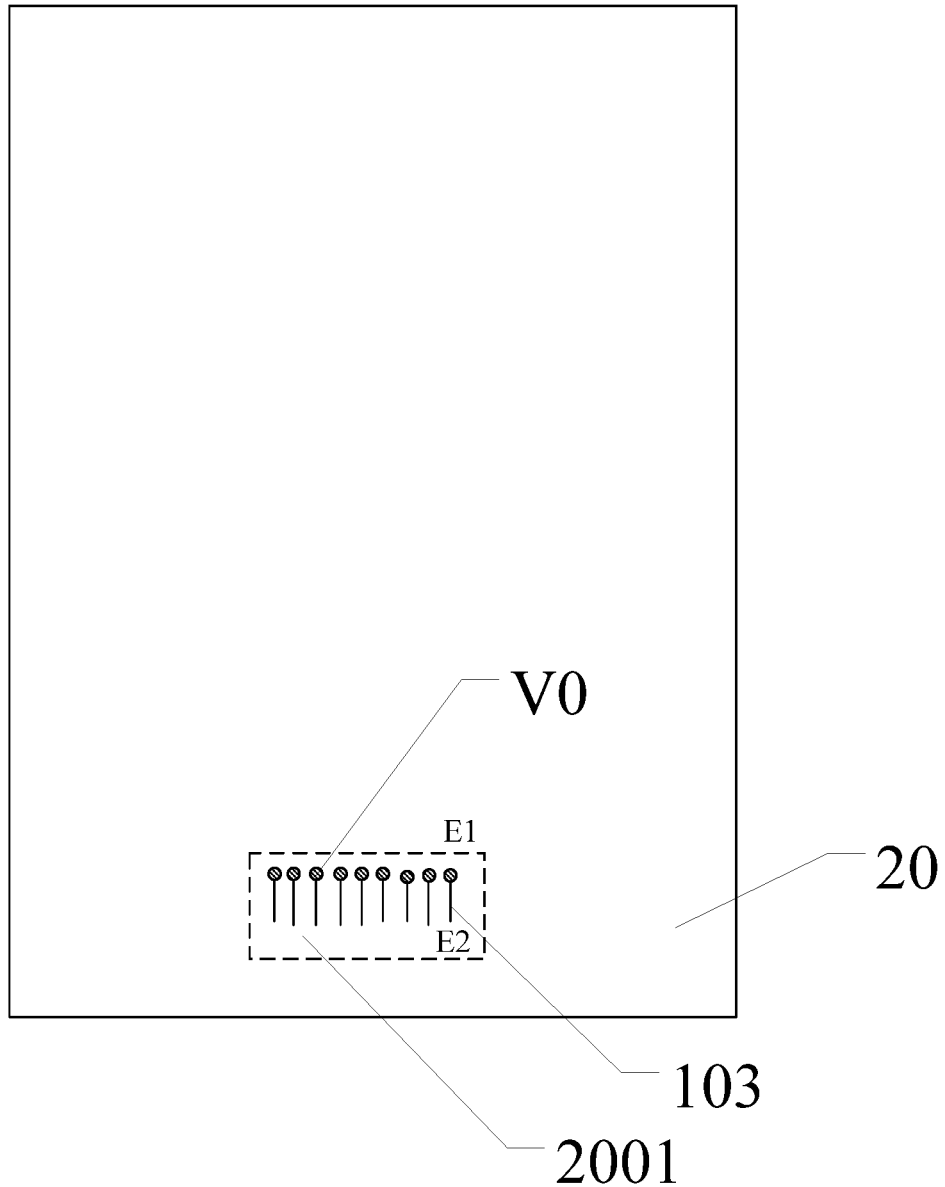
FIG. 3A is a schematic diagram of a connection line on an upper side of a second substrate and a via hole passing through a second substrate and an insulation layer in a force touch module according to an embodiment of the present disclosure.
Figure 3B:
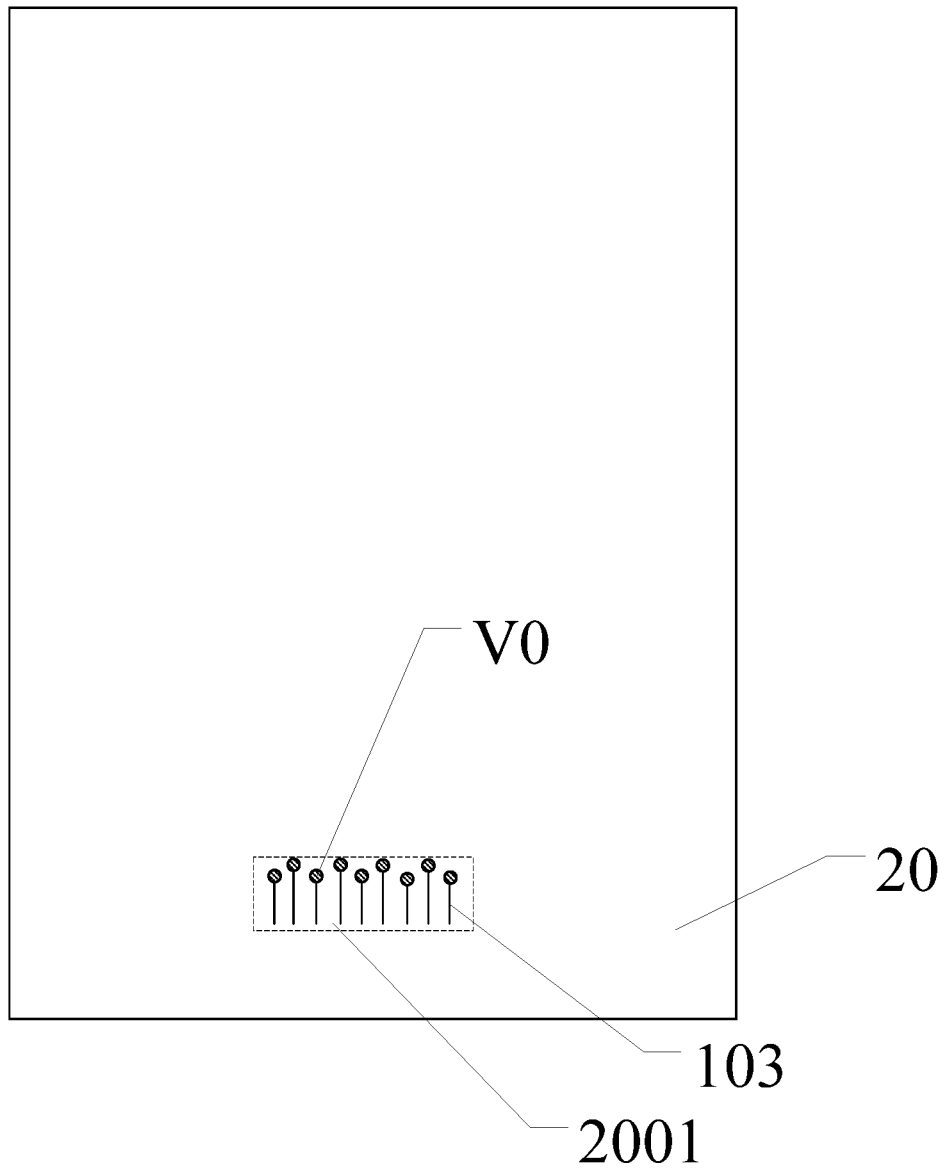
FIG. 3B is a schematic diagram of a connection line on an upper side of a second substrate and a via hole passing through a second substrate and an insulation layer in a force touch module provided by another embodiment of the present disclosure.
Figure 3C:
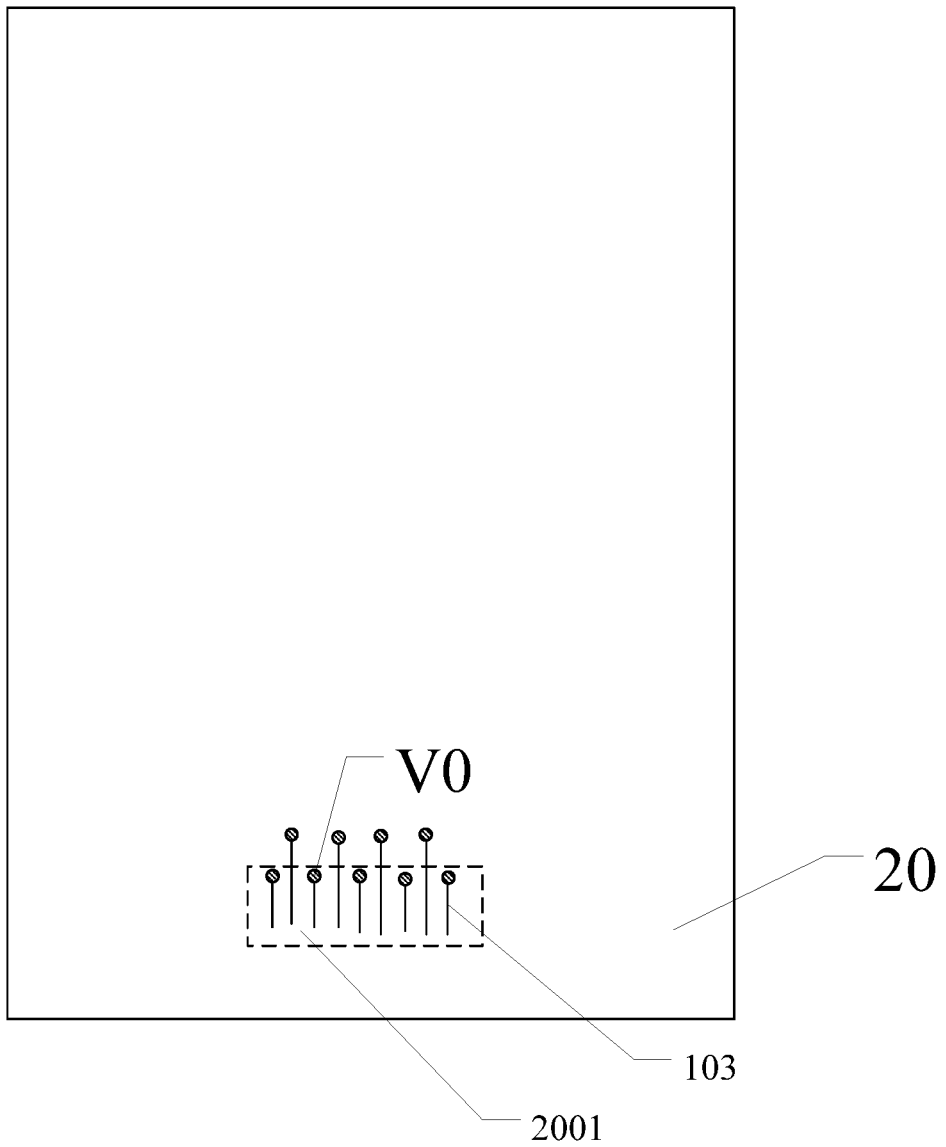
FIG. 3C is a schematic diagram of a connection line on an upper side of a second substrate and a via hole passing through a second substrate and an insulation layer in a force touch module provided by another embodiment of the present disclosure; FIG.

FIGS. 3A-3C are schematic top views of the connection lines 103 and the via holes on the second substrate 20. FIGS. 3A-3C can respectively correspond to FIGS. 2C-2E. Therefore, the force sensing signal lines 1011 of the force sensing electrode patterns 1010 can be led out to the upper side of the second substrate 20 through the via holes V0 passing through the insulation layer 102 and the second substrate 20. For example, the connection lines 103 are led out to a bonding area 2001, so as to be bonded. For example, with reference to FIGS. 3A and 2C (can also refer to FIG. 2A), one end (a first end) E1 of the connection line 103 is electrically connected with the force sensing signal line 1011 through the via hole V0, and the other end (a second end) E2 is led out to the bonding area 2001.

The foregoing is described by taking a case where the connection lines 103 are electrically connected with the force sensing signal lines respectively as an example, but the embodiments of the present disclosure are not limited thereto. For example, the connection lines can be directly electrically connected with the first sensing electrode 110. In this case, the connection lines 103 can also serve as force sensing signal lines.

Figure 4A:
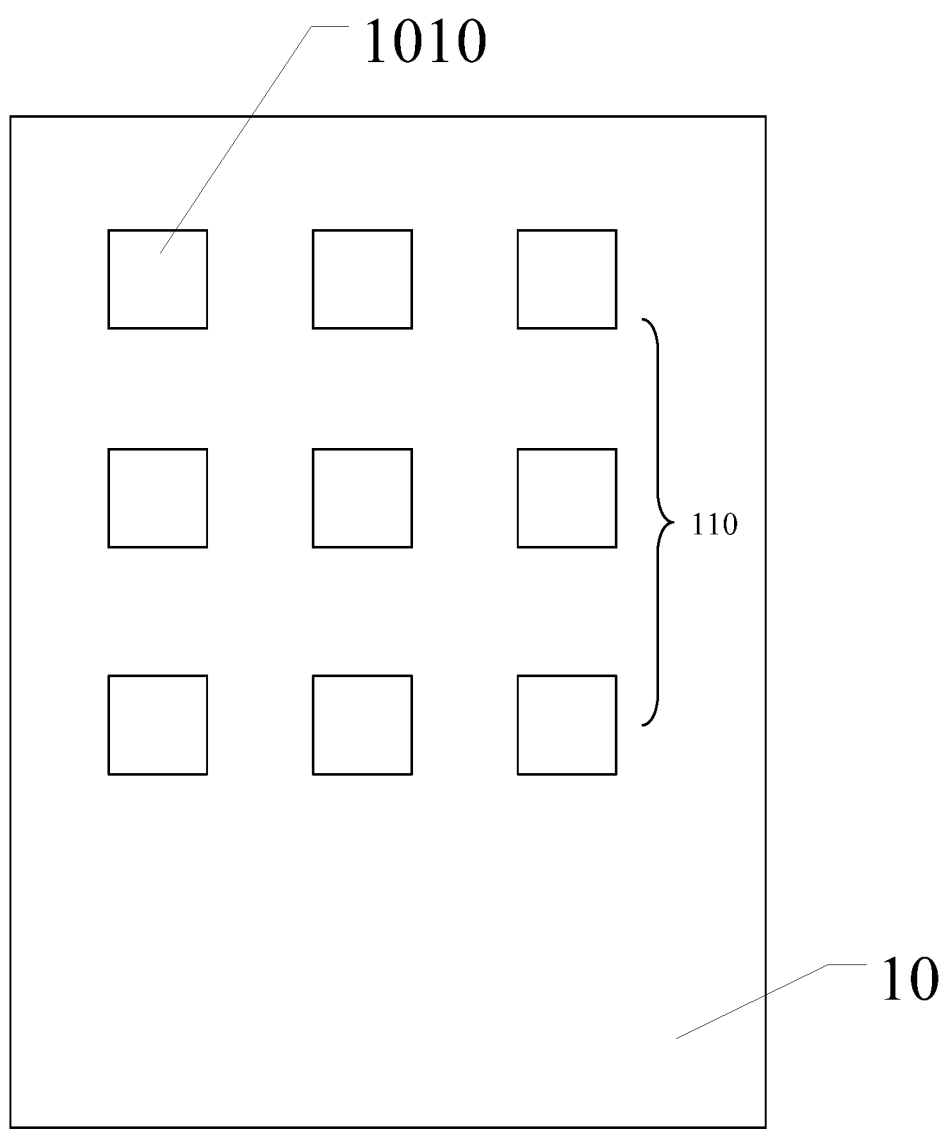
FIG. 4A is a schematic diagram of a first sensing electrode in a force touch module provided by another embodiment of the present disclosure.

FIG. 4A is a schematic diagram of a first sensing electrode 110 in a force touch module provided by another embodiment of the present disclosure.

Figure 4B:
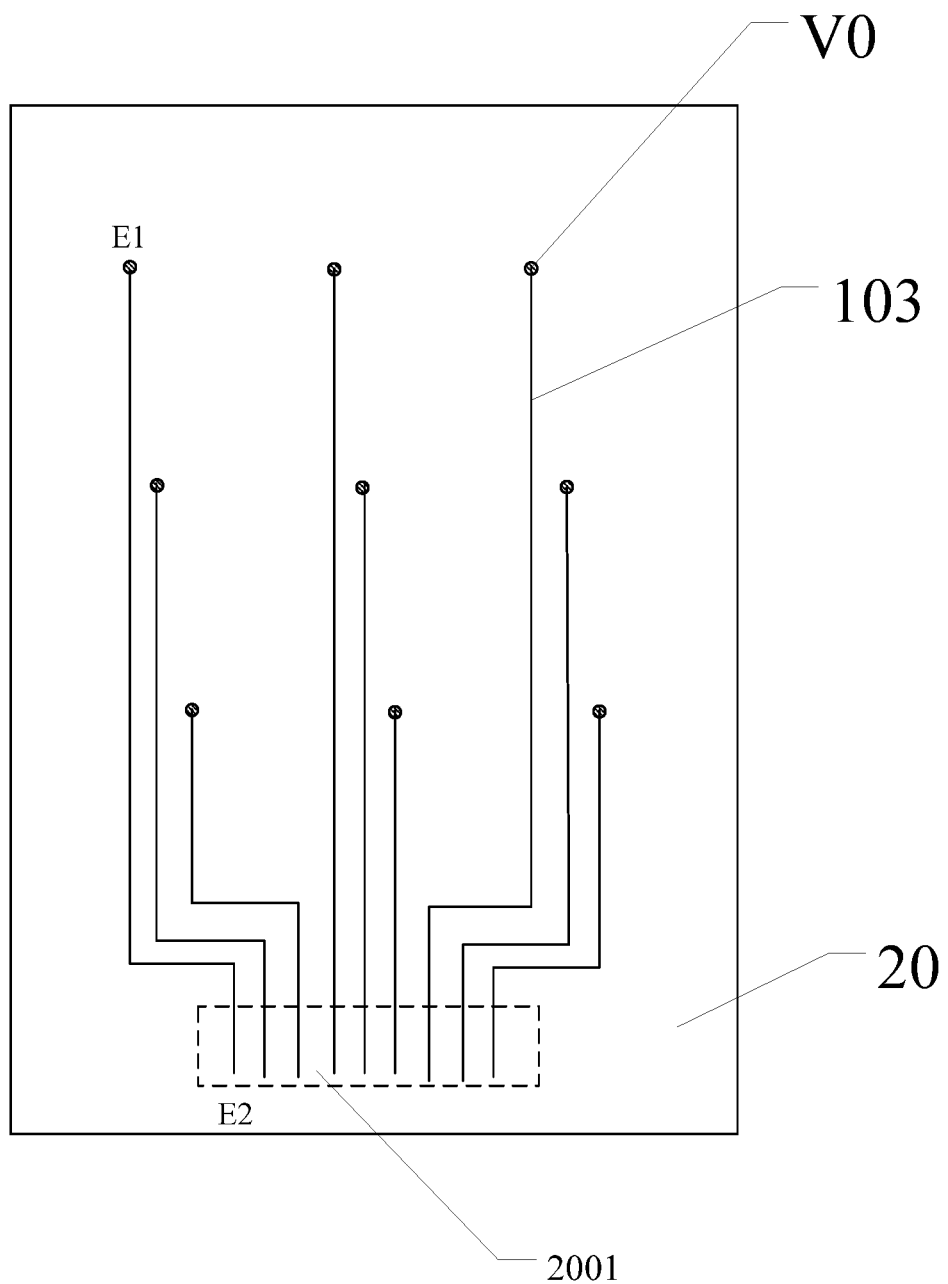
FIG. 4B is a schematic top view of connection lines on the second substrate which are electrically connected with the force sensing electrode patterns through the via holes V0 passing through the insulation layer and the second substrate according to another embodiment of the present disclosure.

FIG. 4B is a schematic top view of the connection lines 103 on the second substrate which are electrically connected with the force sensing electrode patterns 1010 through the via holes V0 passing through the insulation layer 102 and the second substrate 20. The connection line 103 can serve as force sensing signal line. As illustrated by FIG. 4B, one end (a first end) E1 of the connection line 103 is electrically connected to the force sensing electrode pattern 1010 through the via hole V0, and the other end (a second end) E2 is led out to the bonding area 2001.

Figure 4C:
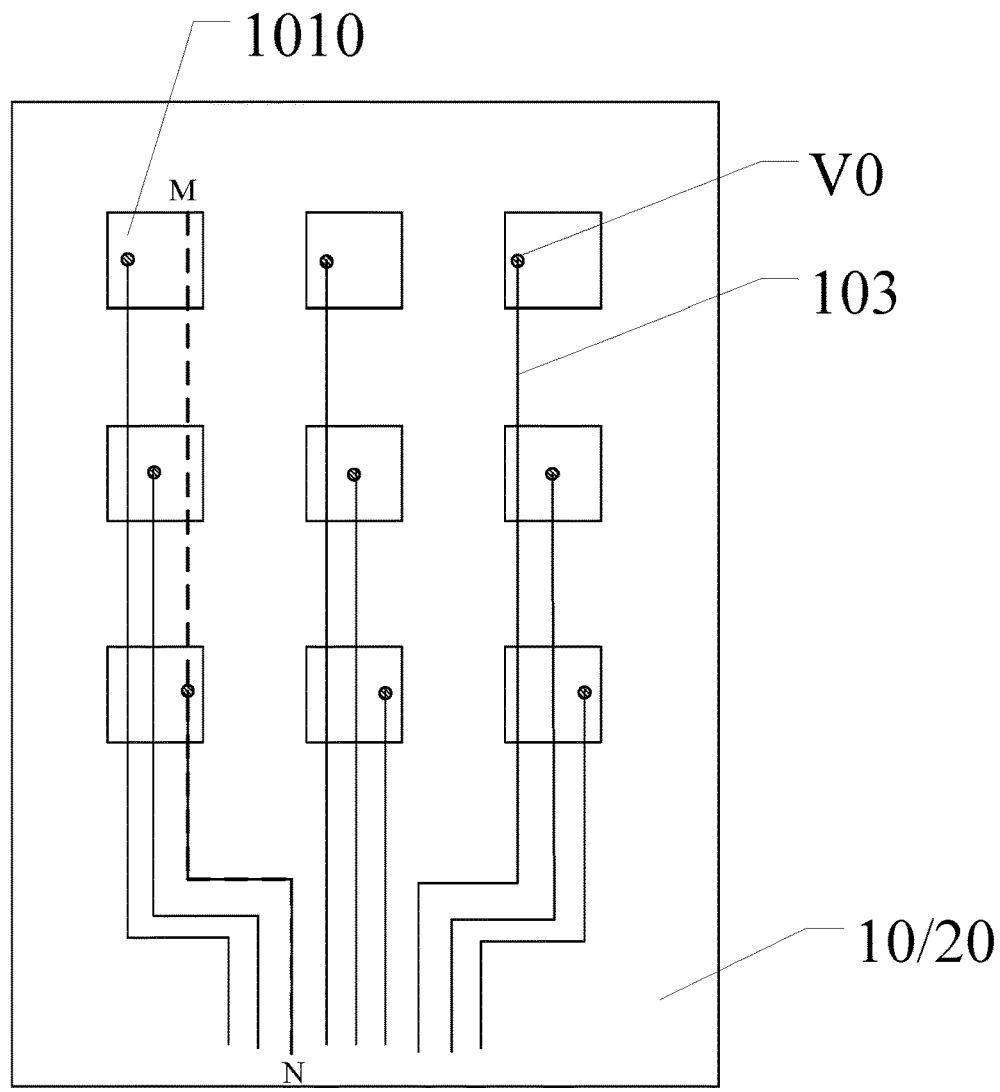
FIG. 4C is a schematic top view of force sensing electrode patterns, via holes passing through the insulation layer and the second substrate, and connection lines in a force touch module provided by another embodiment of the present disclosure.

FIG. 4C is a schematic top view of force sensing electrode patterns 1010, via holes V0 passing through the insulation layer 102 and the second substrate 20, and connection lines 103.

Figure 5:
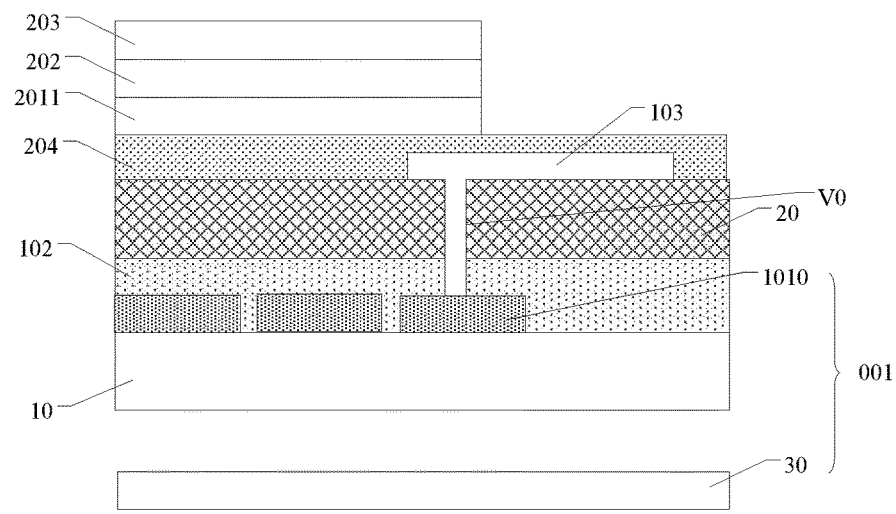
FIG. 5 is a sectional view of a force touch module provided by an embodiment of the present disclosure.

FIG. 5 illustrates a sectional view of a force touch module provided by an embodiment of the present disclosure. FIG. 5 can be a sectional view taken along line M-N in FIG. 4C. An insulation layer 204 can be disposed between the connection line 103 and the thin film transistor layer 201.

For example, as illustrated by FIG. 2A, the first sensing electrode 110 can be directly laid on the first substrate 10. A position of the second substrate 20 and the insulation layer 102 corresponding to the first sensing electrode 110 can be provided with the via hole V0. The second substrate 20 is provided with a connection line 103 (which can serve as a force sensing signal line) thereon, and one end of the connection line 103 is connected with the first sensing electrode 110 through the via hole V0 (can refer to FIG. 4C), and the other end of the connection line 103 can be extended to a bonding area 2001 (can refer to FIG. 4B), so as to be conveniently connected to a corresponding flexible circuit in the device. For example, because the corresponding flexible circuit of the device is generally disposed on the second substrate, and an insulation layer 102 is disposed between the first sensing electrode 110 and the second substrate 20, the via hole V0 needs to be designed to pass through the second substrate 20 and the insulation layer 102, such that the first sensing electrode 110 can be lead to the upper side of the second substrate 20 by the connection line 103 through the via hole V0, so as to be conveniently connected to the flexible circuit. As a result, the connection between the force sensor and a flexible circuit and the connection between the other signal lines and a flexible circuit only needs one bonding process. Herein, the force sensing signal line 1011 is a signal line of the force sensor 001, and is usually a signal line led from the first sensing electrode 110. The connection line 103 is a signal line connected with the first sensing electrode 110 or the force sensing signal line 1011, passing through the insulation layer 102 and the second substrate 20, and located on the second substrate 20.

The force touch module provided by at least one embodiment of the present disclosure, the force sensor is disposed in a layer structure of a display screen, simultaneously a structure of two substrates is utilized to lead out a bonding area of the first sensing electrode of the force sensor and the flexible circuit corresponding to the force sensor to an area near a bonding area of screen signal lines and a screen flexible circuit, i.e., the first sensing electrode is connected to the flexible circuit of the screen by the connection lines and the force sensing signal lines or only by the connection lines serving as the force sensing signal lines, so that the screen is added with a force touch function without additionally adding a bonding process, thereby simplifying the processes, improving the product yield, and not increasing the thickness of the touch module.

As seen from the above-mentioned embodiments, by means of adopting a two substrate structure, then coating a layer of electrode material between the two substrates as a sensing electrode of the force sensor, and the first sensing electrode can be connected to the corresponding flexible circuit of the force sensor by the force sensing signal line through a way of etching the second substrate located on the upper layer to form a via hole, so that the bonding area of the force sensing signal line and the force sensing flexible circuit can be directly led out to the bonding area of the screen signal lines and the flexible circuit of the screen. In other words, the bonding process of the added force touch part can be performed at the same time during the bonding process of the other signal lines of the device and the flexible circuit, without additionally adding a bonding process, thereby largely improving the product yield. At the same time, because the first sensing electrode of the added force sensor is directly integrated into the force touch module, the thickness of the entire touch module does not increase too much, and the touch module is lightened and thinned.

In some embodiments of the present disclosure, the first sensing electrode 110 of the force sensor 001 can be made of a silver paste. For example, the first sensing electrode 110 of the force sensor 001 can be made by brushing a layer of silver paste on the first substrate 10, the fabricating method is not only simple, but also has a low cost.

In some embodiments of the present disclosure, the first sensing electrode 110 of the force sensor 001 includes at least one force sensing electrode pattern. For example, the force sensing electrode patterns are insulated from each other. As illustrated by FIG. 2B and FIG. 4A, the force sensing electrode patterns are correspondingly arranged according to a structure design requirement of a screen, and a value of sheet resistance of each of the force sensing electrode patterns is smaller than a preset sheet resistance threshold value. That is to say, the first sensing electrode 110 can be an entire electrode layer, or can be a sensing electrode formed by a plurality of force sensing electrode patterns. Furthermore, upon the first sensing electrode 110 being formed of a plurality of force sensing electrode patterns, each of the plurality of force sensing electrode patterns needs to be connected to the flexible circuit through respective force sensing signal lines.

For example, it can be seen from the figures that the force sensing electrode patterns are independent and close to each other. This design can largely reduce the resistance value of each of the force sensing electrode patterns, thereby facilitating the detection of the force touch having a smaller magnitude, so as to improve the precision of force touch. At the same time, because the force sensing electrode patterns can be disposed with different shapes according to the requirements, so that the first sensing electrode 110 can be disposed to meet the design requirements of other structures, thereby improving the flexibility of the configuration of the first sensing electrode 110 in the force sensor 001. Besides, a force touch design that different areas in the touch screen are relatively independent with each other can also be achieved.

In some embodiments of the present disclosure, the sheet resistance threshold value is 20 Ω/sq. For example, in a case that the force sensing electrode pattern has a square shape, a resistance between opposite edges of the square-shaped thin film conductive material is sheet resistance, so that the sheet resistance of the force sensing electrode pattern is the same regardless the edge length is 1 m or 0.1 m. Therefore, the sheet resistance of the first sensing electrode is only related to the thickness of the conductive film. This can not only make the force touch more accurate and more sensitive, but also be convenient for control and implementation.

Because a structure with two substrates is adopted in the embodiments of the present disclosure, and an etching process is needed on the second substrate, this kind of structure design is particularly suitable for a flexible substrate or a flexible display device. For example, it can be applied to a design of force touch in a flexible AMOLED (active-matrix organic light emitting diode) touch screen.

In some embodiments of the present disclosure, a dry etching method is adopted to form the via hole V0 passing through the second substrate 20 and the insulation layer 102. For example, the dry etching method is used to etch and remove a part of the insulation layer 102 and the second substrate 20 on the first sensing electrode 110 to form a via hole, so that the first sensing electrode 110 is exposed by the via hole, and then a conductive material is disposed at the etching position, such that the first sensing electrode 110 can be led out to the bonding area 2001 on the upper side of the second substrate 20 by the conductive material (connection line), so as to be conveniently connected to a force sensing flexible circuit (FPC).

Figure 6:
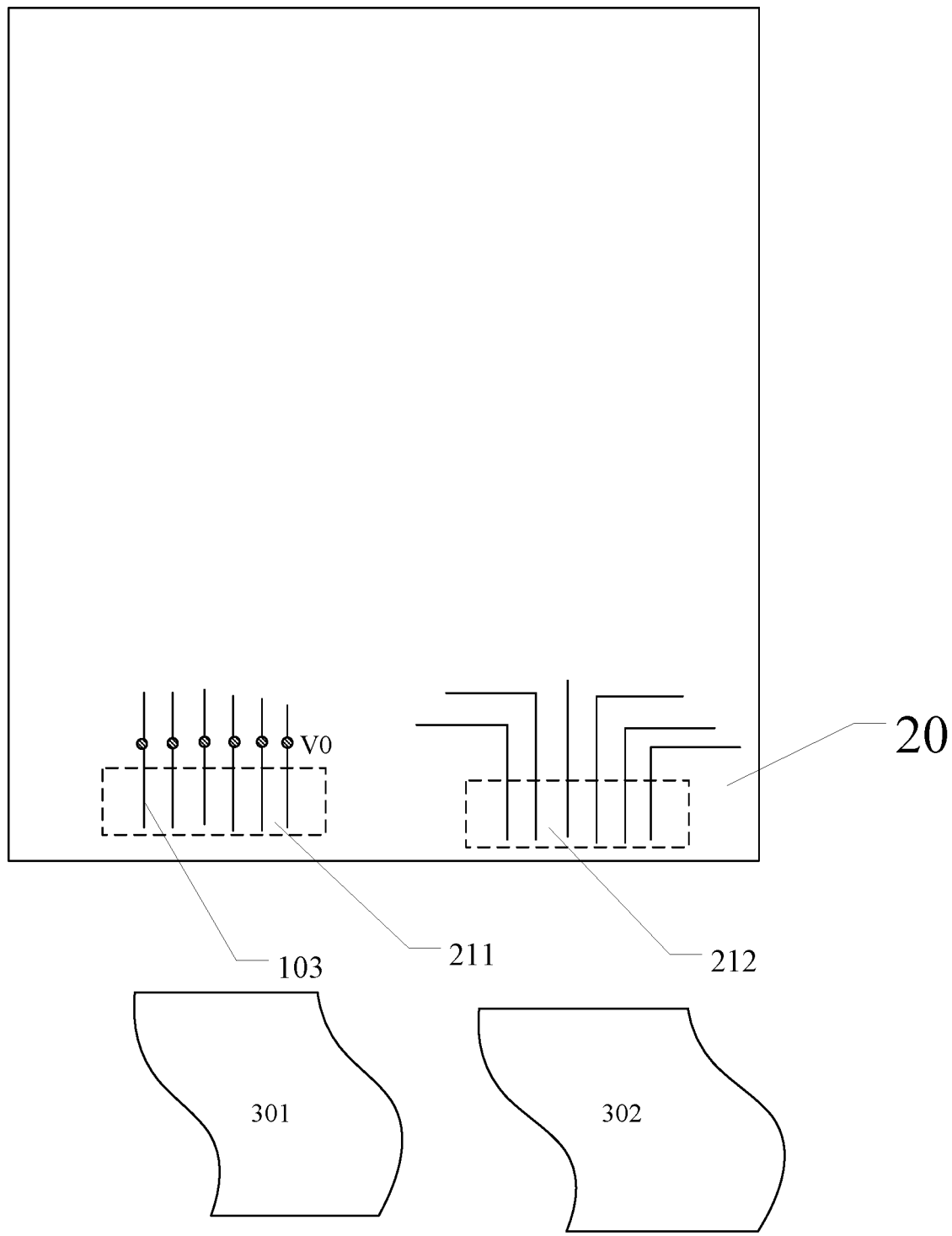
FIG. 6 is a schematic diagram illustrating that a force sensing flexible circuit and a flexible circuit for display can be bonded through the same process in a force touch module provided by an embodiment of the present disclosure.

Referring to FIG. 2B, in a case that the first sensing electrode 110 includes a plurality of force sensing electrode patterns 1010, each of the plurality of force sensing electrode patterns needs to be led out by respective force sensing signal lines 1011, so as to be conveniently connected to the force sensing flexible circuit. Such arrangement can allow the bonding area 211 of the force sensing flexible circuit 301 and the force sensing signal line to be disposed near the bonding area 212 of the screen signal lines 400 and the flexible circuit for display (flexible circuit of the screen) 302 (as illustrated by FIG. 6), and only one bonding process is required. For clarity, other structures are not illustrated in FIG. 6.

In some embodiments of the present disclosure, as illustrated by FIG. 2A, the force touch module further includes a thin film transistor layer 201, a light emitting element layer 202, and an encapsulation layer 203 which are sequentially disposed on the second substrate 20. For example, the thin film transistor layer 201, the light emitting element layer 202, and the first sensing electrode 110 can be connected to the same flexible circuit. For example, the first sensing electrode of the force sensor is connected to the flexible circuit of the display screen by the connection lines and the force sensing signal lines or only by the connection lines, so that upon various signal lines and the flexible circuit being bonded together, the bonding of the connection lines, the screen signal lines, and the flexible circuit can be performed at the same time, without adding an additional bonding process. For example, an active layer of a thin film transistor can be a low temperature poly-silicon (LTPS TFT); the light emitting element can be an organic light emitting diode (OLED); and the encapsulation layer can be a thin film encapsulation (TFE) layer.

For example, in the embodiments of the present disclosure, the principle of force touch is to change a distance between the first sensing electrode and the second sensing electrode by a force. For example, in a case that the force touch module is applied to a mobile phone, a layer of a plate structure of the middle frame of the mobile phone below the touch screen is used as a second sensing electrode. In this way, the first sensing electrode in the touch screen and the middle frame serving as the second sensing electrode form upper and lower plates of a capacitor, the upper and lower plates are arranged in parallel. Upon a finger pressing the first sensing electrode, the distance between the first sensing electrode and the second sensing electrode will change, thereby causing a change in the capacitance of the force sensor. Therefore, the amount of change in the capacitance of the force sensor can be obtained by detecting the current or the amount of charge, thereby detecting the magnitude of the force.

The relationship between the capacitance C between two sensing electrodes and the distance between the plates is:

$$C = \frac{\varepsilon S}{d}$$

wherein, $\varepsilon$ is a dielectric constant of a dielectric between the plates, S is an area of the plates, d is a distance between the plates. According to a change in distance between the plates and/or a change in capacitance C, a magnitude of a force can be obtained.

Figure 7:
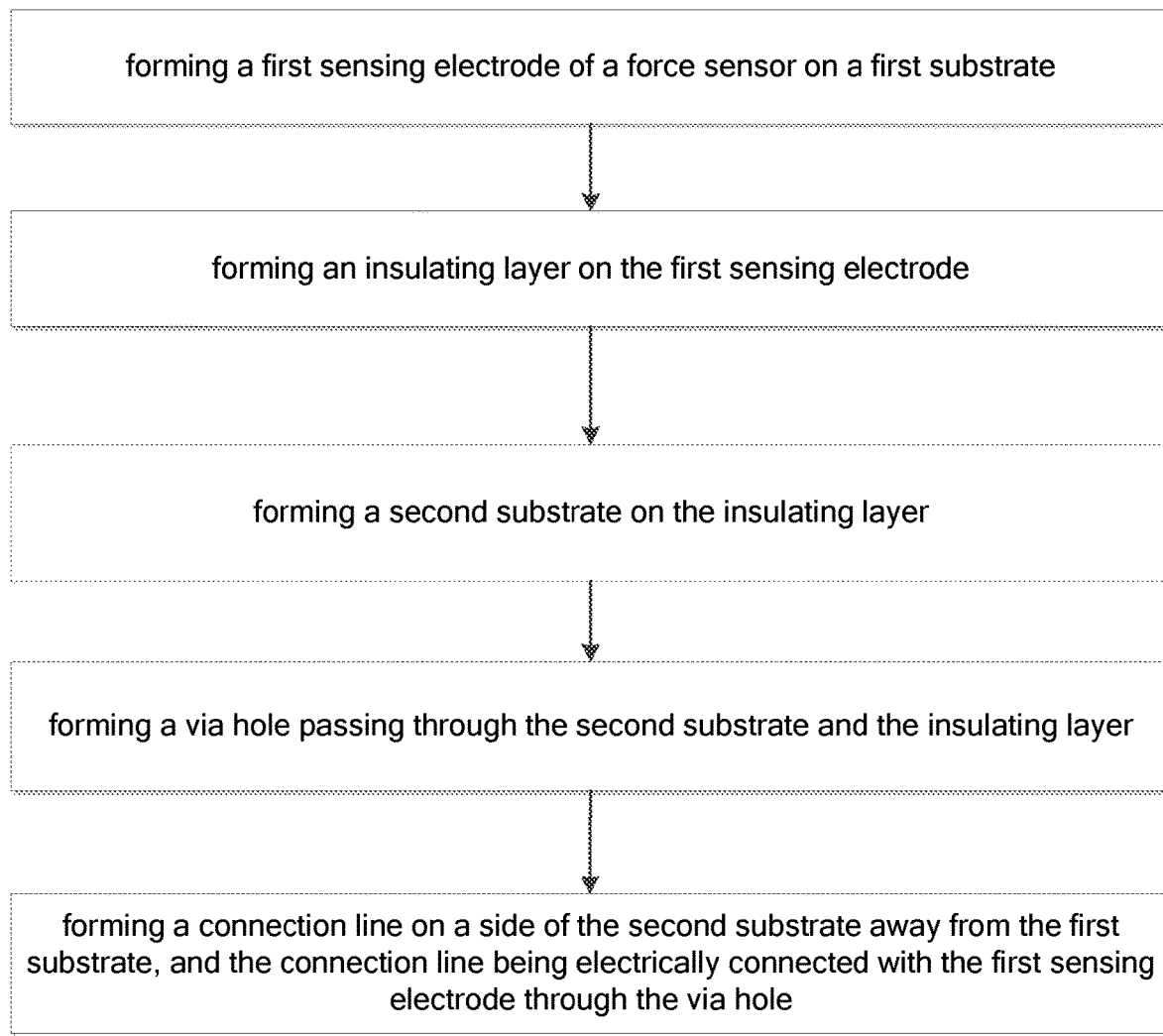
FIG. 7 is a schematic diagram of a manufacturing method of a force touch module according to an embodiment of the present disclosure.

Referring to FIG. 7, which is a flow diagram of a manufacturing method of a force touch module provided by at least one embodiment of the present disclosure, the manufacturing method includes:

S1: forming a first sensing electrode of a force sensor on a first substrate;

S2: forming an insulation layer on the first sensing electrode;

S3: forming a second substrate on the insulation layer;

S4: forming a via hole passing through the second substrate and the insulation layer;

S5: forming a connection line on a side of the second substrate away from the first substrate, and the connection line being electrically connected with the first sensing electrode through the via hole.

Referring to FIG. 8, the manufacturing method of a force touch module provided by at least one embodiment of the present disclosure includes the following steps.

Step S01: forming a first substrate, and laying an electrode material on the first substrate as a first sensing electrode of a force sensor;

Step S02: forming an insulation layer on the first sensing electrode;

Step S03: forming a second substrate on the insulation layer;

Step S04: forming a via hole on the second substrate at a position corresponding to the first sensing electrode, and the via hole also passes through the insulation layer;

Step S05: forming a connection line on the second substrate, and one end of the connection line is connected with the first sensing electrode through the via hole, and the other end is connected to a force sensing flexible circuit; the connection line can be considered as a force sensing signal line;

Step S06: the following fabrications of the other layer structures can refer to common designs, which are omitted herein. In this way, by directly arranging one sensing electrode of the force sensor between the two substrates, upon subsequently performing a bonding process to a flexible circuit and various signal lines, the bonding of the connection line and its flexible circuit can be achieved at the same time, so that a force touch function is added without increasing an additional bonding process, and the touch module is kept light and thin.

In other embodiments of the present disclosure, a touch screen is further disclosed. The touch screen includes the force touch module described in any one of the above-mentioned embodiments, which is used to protect the display screen or the touch screen including the force touch module described in the embodiments of the present disclosure.

In other embodiments of the present disclosure, a display device is further disclosed. The display device includes any one of the touch screens described above, which is used to protect the display device including the force touch module described in the embodiments of the present disclosure. For example, the display device includes a mobile phone, a watch, a tablet computer, a touch notebook, and the like.

It should be understood by those of ordinary skill in the art that: the discuss on the any above-mentioned embodiments is merely exemplary, and is not intended to imply that the scope of the present disclosure (including claims) is limited to these examples. In the spirit of the embodiments of the present disclosure, the technical features in the above-mentioned embodiments or in different embodiments can also be combined, and the steps can be implemented in any order, and there are many other variations at different aspects of the disclosure as described above, which are not provided in the details for the sake of brevity.

In addition, for simplifying the description and discussion, and not making the the embodiments of the present disclosure obscure, well-known power supplies/ground connection of the integrated circuit (IC) chips and other components may or may not be illustrated in the provided drawings. Furthermore, the devices can be illustrated in a block diagram form in order to avoid obscuring the embodiments of the present disclosure, which also takes the following facts into account, i.e., the details regarding the implementation of these devices in the block diagram form are highly dependent on the implementation platform to implementing the present disclosure (that is, these details should be completely within the understanding of those skilled in the art). In a case that specific details (e.g., circuit) are set forth to describe exemplary embodiments of the present disclosure, it will be apparent to one skilled in the art that the present disclosure can be implemented without the specific details or upon the specific details being changed. Therefore, these descriptions should be considered as illustrative and not limitative.

The foregoing is only the embodiments of the present invention and not intended to limit the scope of protection of the present invention. Any changes or substitutions easily occur to those skilled in the art within the technical scope of the present disclosure should be covered in the protection scope of the present disclosure. Therefore, the protection scope of the present disclosure should be based on the protection scope of the claims.

What is claimed is:

1. A force touch module, comprising:
a first substrate:
a second substrate on the first substrate;
an insulation layer, located between the first substrate and the second substrate;
a force sensor, comprising a first sensing electrode located between the insulation layer and the first substrate;
a via hole, at least passing through the second substrate and the insulation layer; and
a connection line, located on a side of the second substrate away from the first substrate, the connection line being electrically connected with the first sensing electrode through the via hole,
wherein the connection line is electrically connected with the first sensing electrode via a force sensing signal line, and
wherein the force sensing signal line is located between the insulation layer and the first substrate.

2. The force touch module according to claim 1, wherein a first end of the connection line is electrically connected with the first sensing electrode through the via hole.

3. The force touch module according to claim 2, wherein a second end of the connection line is connected to a force sensing flexible circuit.

4. The force touch module according to claim 3, wherein the first sensing electrode comprises at least one force sensing electrode pattern, and each sensing electrode pattern is connected to the force sensing flexible circuit through respective connection lines.

5. The force touch module according to claim 3, wherein the first sensing electrode comprises a plurality of force sensing electrode patterns, and each of the plurality of force sensing electrode patterns is connected to the force sensing flexible circuit through respective connection lines, each of the connection lines is electrically connected to the force sensing electrode pattern through respective via holes, and via holes of the connection lines are not in a straight line.

6. The force touch module according to claim 1, wherein the force sensing signal line and the first sensing electrode are in a same layer.

7. The force touch module according to claim 1, wherein the first sensing electrode is made of silver paste.

8. The force touch module according to claim 1, wherein both the first substrate and the second substrate are flexible substrates.

9. The force touch module according to claim 1, further comprising a thin film transistor, a light emitting element and an encapsulation layer, which are sequentially disposed on the second substrate; wherein the thin film transistor, the light emitting element and the first sensing electrode are connected to a same flexible circuit for display.

10. The force touch module according to claim 1, wherein the force sensor further comprises a second sensing electrode, and the second sensing electrode is located on a side of the first substrate opposite to the first sensing electrode.

11. A touch screen, comprising the force touch module according to claim 1.

12. A display device, comprising the touch screen according to claim 11.

13. A force touch module, comprising:
a first substrate;
a second substrate on the first substrate;
an insulation layer, located between the first substrate and the second substrate;
a force sensor, comprising a first sensing electrode located between the insulation layer and the first substrate;
a via hole, at least passing through the second substrate and the insulation layer; and
a connection line, located on a side of the second substrate away from the first substrate, the connection line being electrically connected with the first sensing electrode through the via hole,
wherein a first end of the connection line is electrically connected with the first sensing electrode through the via hole,
wherein a second end of the connection line is connected to a force sensing flexible circuit,
wherein the first sensing electrode comprises at least one force sensing electrode pattern, and each sensing electrode pattern is connected to the force sensing flexible circuit through respective connection lines, and
wherein a value of a sheet resistance of each force sensing electrode pattern is less than a sheet resistance threshold value.

14. The force touch module according to claim 13, wherein the connection line is electrically connected with the first sensing electrode via a force sensing signal line.

15. The force touch module according to claim 13, wherein the sheet resistance threshold value is 20 $\Omega$/sq.

16. A manufacturing method of a force touch module, comprising:
forming a first sensing electrode of a force sensor on a first substrate;
forming an insulation layer on the first sensing electrode;
forming a second substrate on the insulation layer;
forming a via hole at least passing through the second substrate and the insulation layer; and
forming a connection line on a side of the second substrate away from the first substrate, and the connection line being electrically connected with the first sensing electrode through the via hole,
wherein the connection line is electrically connected with the first sensing electrode via a force sensing signal line, and
wherein the force sensing signal line is located between the insulation layer and the first substrate.

17. The manufacturing method according to claim 16, wherein upon forming the first sensing electrode on the first substrate, simultaneously forming the force sensing signal line electrically connected with the first sensing electrode.

18. The manufacturing method according to claim 16, wherein the force sensor further comprises a second sensing electrode, the second sensing electrode is located on a side of the first substrate opposite to the first sensing electrode.

19. The manufacturing method according to claim 16, wherein one end of the connection line is connected with the first sensing electrode through the via hole, and the other end of the connection line is connected to a force sensing flexible circuit, and the force sensing flexible circuit and a flexible circuit used for display are bonded through a same process.

\* \* \* \* \*